(12) United States Patent
Chou et al.

(10) Patent No.: US 11,149,892 B2
(45) Date of Patent: Oct. 19, 2021

(54) CHECK STRUCTURE FOR CONNECTION OF AIR NOZZLE OF TIRE AND CONNECTION HOSE OF AIR COMPRESSOR

(71) Applicants: Wen-San Chou, Tainan (TW);
Cheng-Hsien Chou, Tainan (TW)

(72) Inventors: Wen-San Chou, Tainan (TW);
Cheng-Hsien Chou, Tainan (TW)

( * ) Notice: Subject to any disclaimer, the term of this patent is extended or adjusted under 35 U.S.C. 154(b) by 0 days.

(21) Appl. No.: 17/031,519

(22) Filed: Sep. 24, 2020

(65) Prior Publication Data
US 2021/0086460 A1 Mar. 25, 2021

(30) Foreign Application Priority Data
Sep. 25, 2019 (TW) .................................. 108134731

(51) Int. Cl.
*F16L 37/40* (2006.01)
*B29C 73/02* (2006.01)
*B29C 73/16* (2006.01)

(52) U.S. Cl.
CPC ............ *F16L 37/40* (2013.01); *B29C 73/025* (2013.01); *B29C 73/166* (2013.01)

(58) Field of Classification Search
CPC ... B60C 29/064; B60C 29/062; B29C 73/166; B60S 5/04; B29L 2030/00; F16K 15/20; Y10T 137/3724; F16L 29/04; F16L 37/40
USPC ........................................................ 141/38
See application file for complete search history.

(56) References Cited

U.S. PATENT DOCUMENTS

| | | | | |
|---|---|---|---|---|
| 2008/0257416 A1* | 10/2008 | Hickman | ............... | F16L 29/02 137/223 |
| 2013/0105055 A1* | 5/2013 | Chou | ..................... | B60S 5/043 152/416 |
| 2013/0284312 A1* | 10/2013 | Chou | ..................... | F16K 15/20 141/38 |
| 2019/0193349 A1* | 6/2019 | Chou | ................... | B29C 73/166 |
| 2020/0368980 A1* | 11/2020 | Dowel | ................. | F16K 15/026 |

FOREIGN PATENT DOCUMENTS

WO WO-2013110486 A1 * 8/2013 ........... B29C 73/166

* cited by examiner

*Primary Examiner* — Timothy P. Kelly

(57) ABSTRACT

A check structure for a connection of an air nozzle of a tire and a connection hose of an air compressor, the air compressor contains: a box, a sealant supply can, and a connection hose. The box includes a body of the air compressor. The sealant supply can includes an open segment and a supply tube. The connection hose includes a first segment and a second segment. The second segment has a check connector which includes a fitting sleeve, and the fitting sleeve has a threaded orifice, a through orifice, and a projected shoulder. A cylindrical base includes a hollow room, a stepped coupling segment, a conduit, and a tilted fence. A valve bolt includes a post, a connecting disc, multiple peripheral channels, a neck, multiple spaced slots, and a seal ring. A first spring is received into the conduit from the stepped coupling segment of the cylindrical base.

5 Claims, 9 Drawing Sheets

CHECK STRUCTURE FOR CONNECTION OF AIR NOZZLE OF TIRE AND CONNECTION HOSE OF AIR COMPRESSOR

FIELD OF THE INVENTION

The present invention relates to a check structure for connection of air nozzle of a tire and a connection hose of an air compressor, which is capable of avoiding counterflow and eruption of a chemical sealant.

BACKGROUND OF THE INVENTION

A conventional air nozzle of a tire of a vehicle is used to inflate or discharge air into or from the tire. Furthermore, a conventional tire repair device employed to feed chemical sealant and to inflate air into a tire that is broken. The tire repair device is connected to an air compressor, and a sealant supply can is connected to an outlet valve of the air compressor, wherein compressed air is controlled by a control valve to output the chemical sealant out of a connector on a distal end of a connection hose with the compressed air. However, when a connection structure of the connector of the connection hose and the air core of the tire are not operated properly, the chemical sealant easily erupts out of the connector of the connection hose.

The present invention has arisen to mitigate and/or obviate the afore-described disadvantages.

SUMMARY OF THE INVENTION

The primary aspect of embodiments of the present invention is to provide a check structure for a connection of an air nozzle of a tire and a connection hose of an air compressor that is capable of feeding chemical sealant and inflating compressed air into a tire after the tire is broken.

Another aspect of embodiments of the present invention is to provide a check structure for a connection of an air nozzle of a tire and a connection hose of an air compressor which is capable of avoiding counterflow and eruption of chemical sealant.

DETAILED DESCRIPTION OF THE PREFERRED EMBODIMENTS

Figure 1:
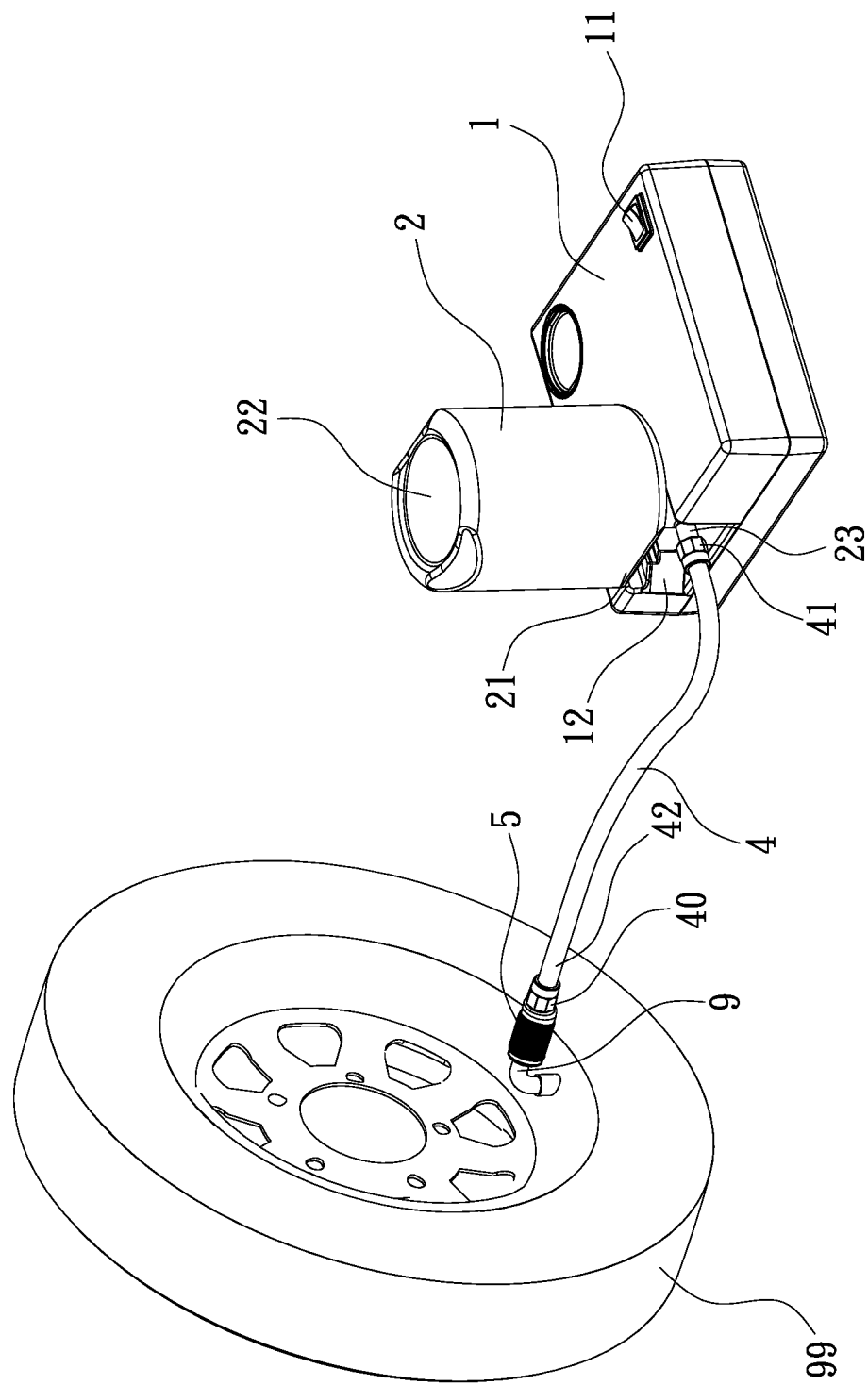
FIG. 1 is a perspective view showing the application of a check structure for a connection of an air nozzle of a tire and a connection hose of an air compressor according to a preferred embodiment of the present invention.
Figure 2:
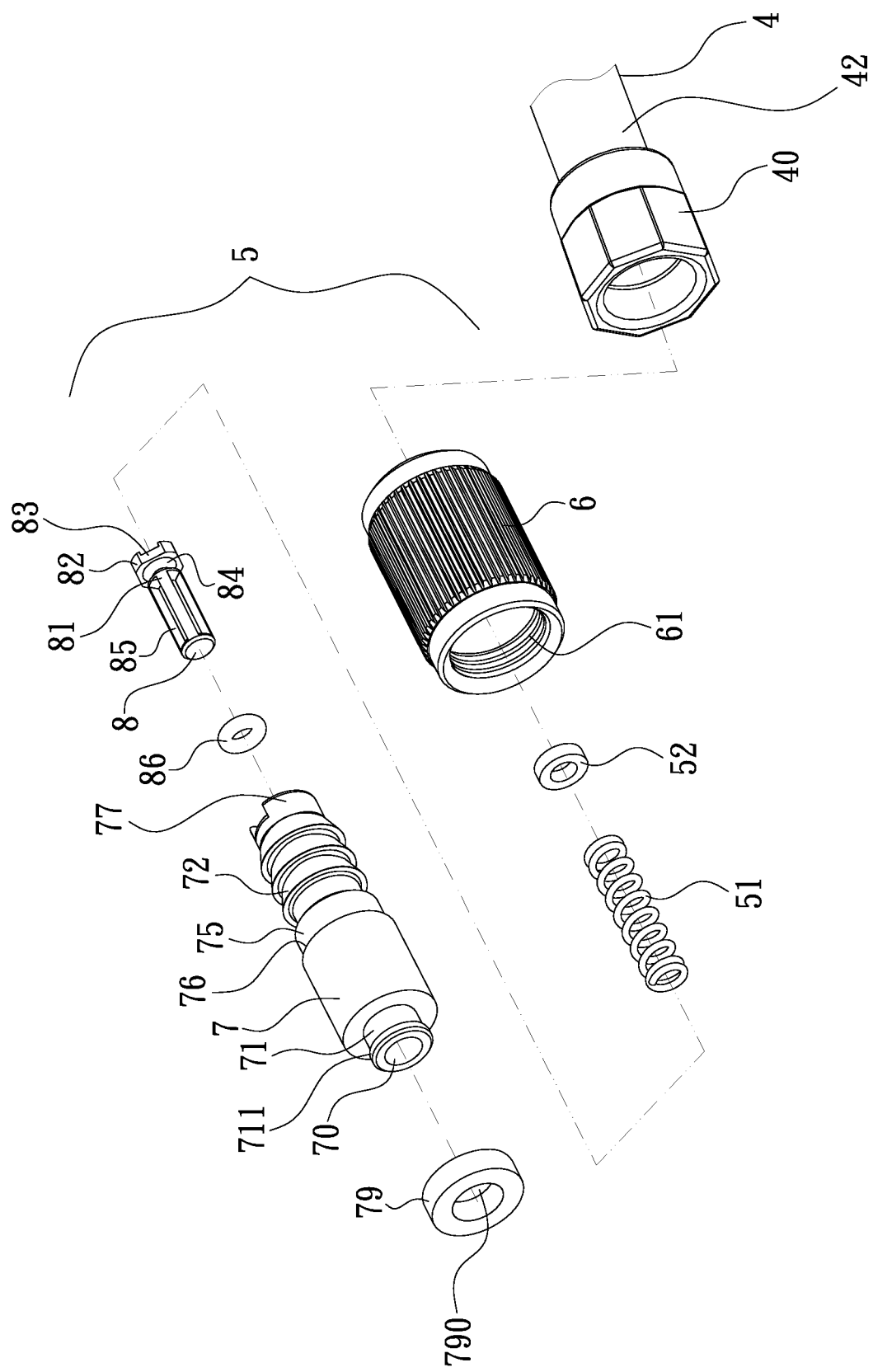
FIG. 2 is a perspective view showing the exploded components of the check structure according to the preferred embodiment of the present invention.
Figure 3:
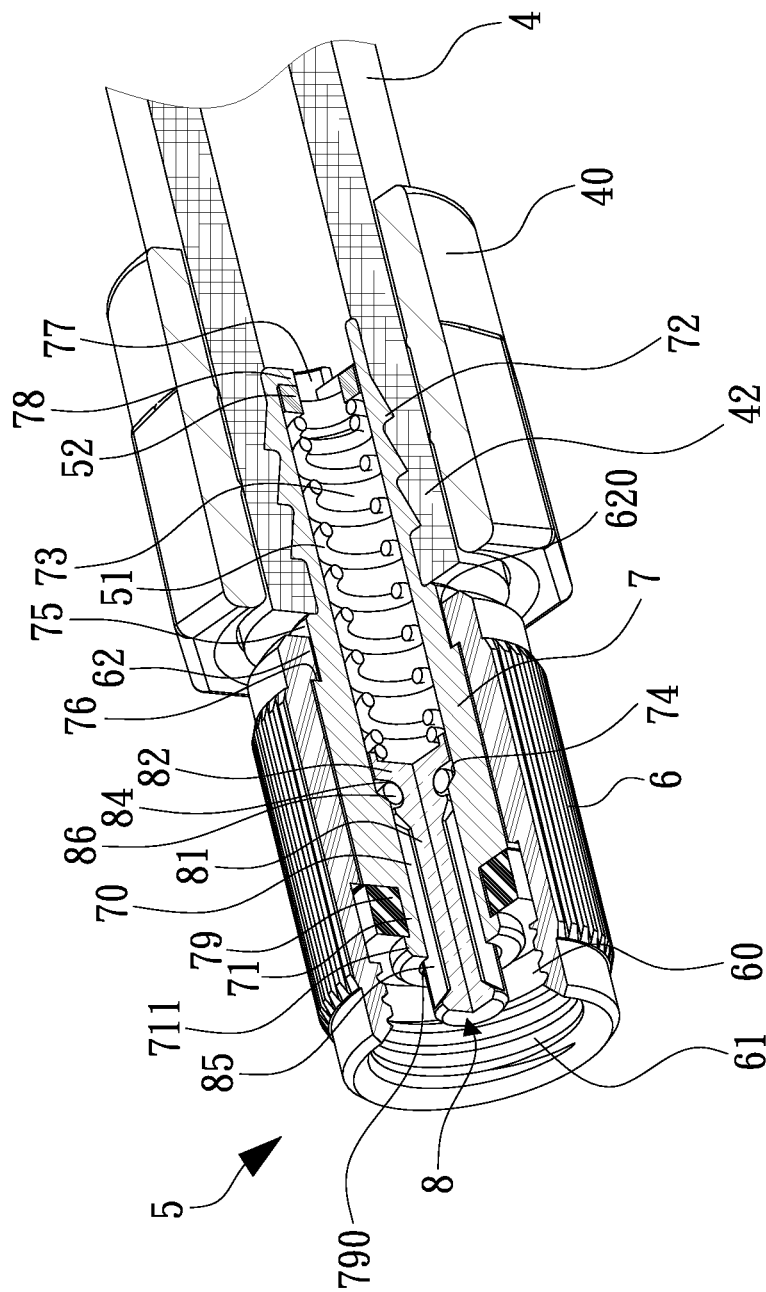
FIG. 3 is a cross-sectional perspective view showing the assembly of the check structure according to the preferred embodiment of the present invention.

With reference to FIGS. 1-3, an air compressor according to a preferred embodiment of the present invention comprises: a box 1, a sealant supply can 2, and a connection hose 4.

The box 1 includes a button 11 fixed on a top thereof, a coupling orifice 12 defined on a peripheral side thereof, and a body of the air compressor (not shown) accommodated in the box 1. The connection hose 4 includes a first segment 41 formed on a first end thereof, a second segment 42 formed on a second end thereof and having a check connector 5 connected on the second segment 42. The sealant supply can 2 is connected on the coupling orifice 12, and the tire sealant supply can 2 includes an open segment 21 extending downward, a bottom fringe 22 extending upward, and a supply tube 23 configured to engage with the first segment 41 of the connection hose 4. The check connector 5 of the second segment 42 of the connection hose 4 is screwed with an air nozzle 9 of a tire 99, when feeding chemical sealant and inflating compressed air into the tire 99 that is broken. After the box 1 is started by a vehicle power supply or other DC power supply, the compressed air from the air compressor forces the chemical sealant of the sealant supply can 2 to flow into the tire 99 via the connection hose 4, thus repairing and inflating the tire 99. The tire 99 is any one of an automobile tire, a motorcycle tire, and a bicycle tire.

Figure 4:
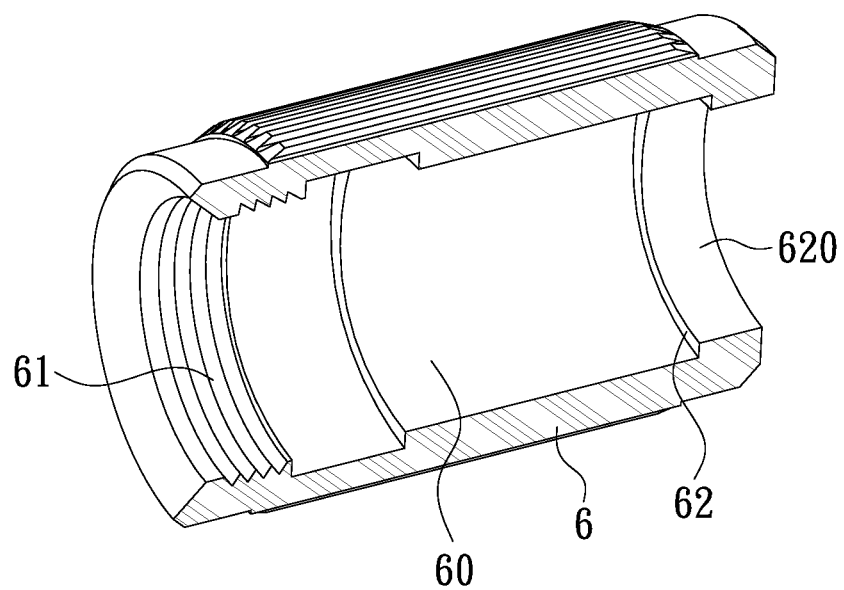
FIG. 4 is a cross-sectional perspective view showing the assembly of a fitting sleeve of the check structure according to the preferred embodiment of the present invention.

Referring to FIGS. 2-7, a check structure for a connection of the air nozzle of the tire and the connection hose of the air compressor is applied to avoid eruption of the chemical sealant, and the check structure comprises: the check connector 5 connected on the second segment 42 of the connection hose 4. The check connector 5 includes a fitting sleeve 6 (as shown in FIG. 4) formed in a cylindrical shape, and the fitting sleeve 6 has a chamber 60 defined therein, a threaded orifice 61 formed in a first end thereof and having female threads, a through orifice 620 defined on a second end of the fitting sleeve 6, a projected shoulder 62 formed on an inner wall of the chamber 60 proximate to the through orifice 620, and a diameter of the projected shoulder 62 is greater than a diameter of the through orifice 620, wherein the threaded orifice 61, the chamber 60, and the through orifice 620 are in communication with one another.

Figure 5:
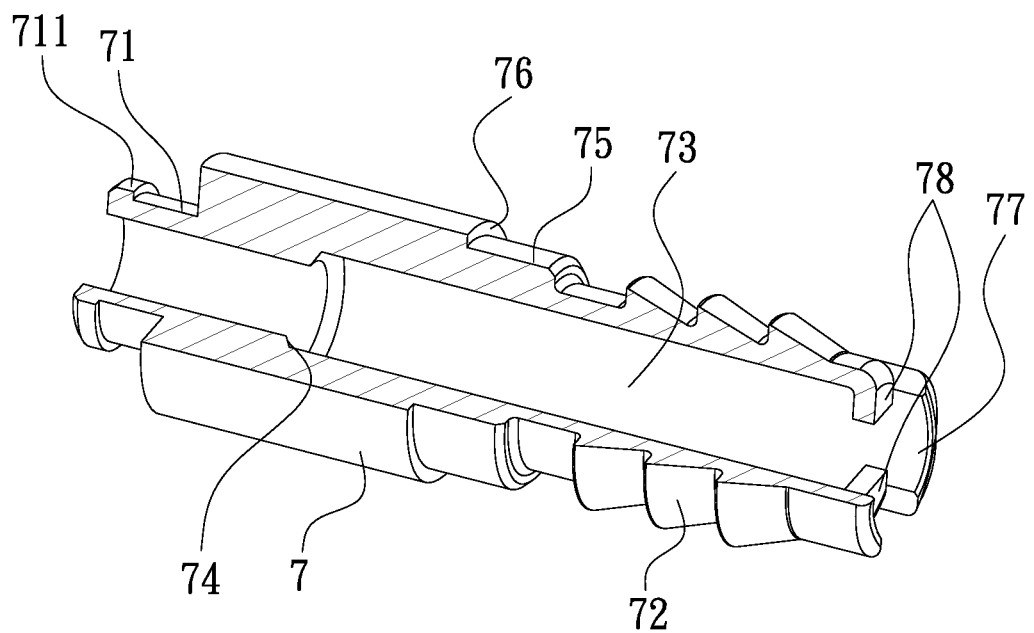
FIG. 5 is a cross-sectional perspective view showing the assembly of a cylindrical base of the check structure according to the preferred embodiment of the present invention.

A cylindrical base 7 (as shown in FIG. 5) includes a peg 71 extending from a first end thereof and having a contacting rib 711 extending outward from a distal end of the peg 71, a hollow room 70 defined in the cylindrical base 7 and the peg 71, a stepped coupling segment 72 extending on an outer wall of a second end of the cylindrical base 7, and a conduit 73 defined in the stepped coupling segment 72 and communicating with the hollow room 70, wherein a diameter of the conduit 73 is greater than a diameter of the hollow room 70, The cylindrical base 7 further includes a tilted fence 74 formed between the hollow room 70 and the conduit 73, a recessed section 75 formed proximate to the stepped coupling segment 72, wherein a diameter of the cylindrical base 7 is greater than a diameter of the recessed section 75, and a stepped shoulder 76 is defined between the cylindrical base 7 and the recessed section 75.

Figure 6:
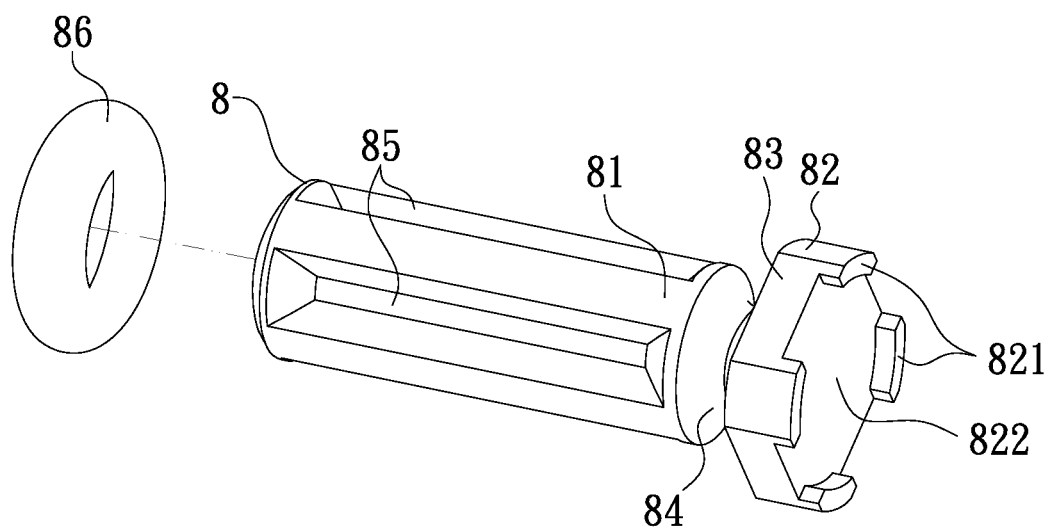
FIG. 6 is a perspective view showing the exploded components of a valve bolt of the check structure according to the preferred embodiment of the present invention.

An abutting washer 79 having a passing orifice 790 is fit on the peg 71 of the cylindrical base 7, wherein a first end of the abutting washer 79 contacts with the cylindrical base 7, and a second end of the abutting washer 79 abuts against the contacting rib 711 of the cylindrical base 7. A valve bolt 8 (as shown in FIG. 6) includes a post 81 extending on a first end thereof, a connecting disc 82 extending from a second end of the valve bolt 8, multiple peripheral channels 83 formed around a peripheral wall of the connecting disc 82, a neck 84 formed between the post SI and a first end of the connecting disc 82, multiple spaced slots 85 defined around the post 81, multiple spaced protrusions 821 extending from a second end of the connecting disc 82, and an accommodation space 822 that is surrounded by the multiple spaced protrusions 821.

A seal ring 86 is fit on the neck 84 of the valve bolt 8, such that the first end of the valve bolt 8 is put into the hollow room 70 of the cylindrical base 7 via the conduit 73 and the hollow room 70 of the stepped coupling segment 72 of the cylindrical base 7 so that the post 81 of the valve bolt 8 is located in the hollow room 70 and a portion of the post 81 extends from the cylindrical base 7, The seal ring 86 of the valve bolt 8 is located in the conduit 73 of the stepped coupling segment 72 and contacts the tilted fence 74 of the cylindrical base 7, as illustrated in FIG. 3.

A first spring 51 is received into the conduit 73 from the stepped coupling segment 72 of the cylindrical base 7 so that a first end of the first spring 51 abuts against the connecting disc 82 of the valve bolt 8 and is located at the accommodation space 822. A plain washer 52 is fit on a second end of the first spring 51, A distal end 77 of the stepped coupling segment 72 of the cylindrical base 7 is pushed to form two opposite bent wings 78, mid the two bent wings 78 are configured to engage with the seal ring 86, the valve bolt 8, the first spring 51, and the plain washer 52 in the conduit 73, wherein the first spring 51 pushes the seal ring 86 to contact with the tilted fence 74 of the cylindrical base 7 and to close the hollow room 70 of the cylindrical base 7.

Figure 8:
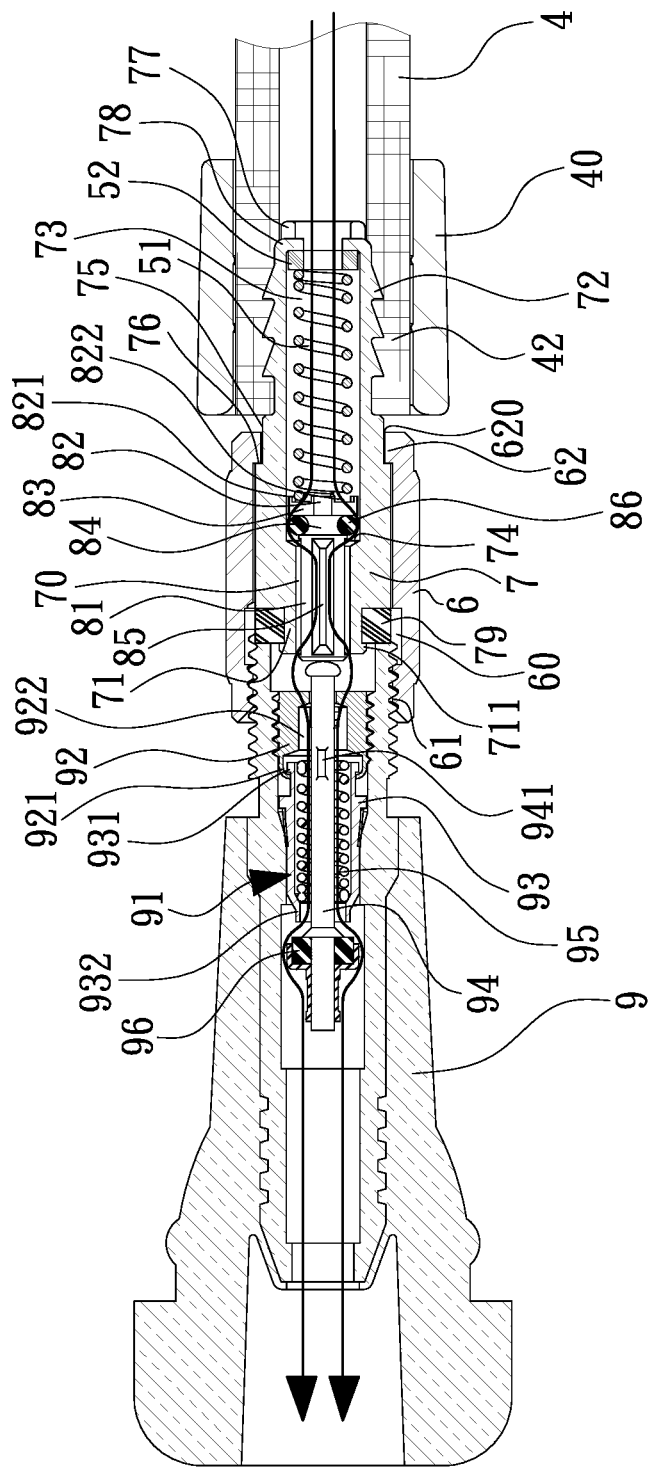
FIG. 8 is a cross sectional view showing the operation of the check structure according to the preferred embodiment of the present invention.

When the stepped coupling segment 72 connected with the abutting washer 79, the first spring 51, the plain washer 52 and the seal ring 86 is fitted to the through orifice 620 of the projected shoulder 62 from the threaded orifice 61 of the fitting sleeve 6 via the chamber 60. The projected shoulder 62 contacts the stepped shoulder 76 of the cylindrical base 7. The stepped coupling segment 72 of the cylindrical base 7 extends out of the fitting sleeve 6 to connect with the second segment 42 of the connection hose 4, and a fixing bushing 40 is configured to connect together the connection hose 4 and the check connector 5, as shown in FIG. 8. Thereby, the first spring 51 pushes the seal ring 86 of the valve bolt 8 to contact with the tilted fence 74 of the cylindrical base 7 and to close the hollow room 70 of the cylindrical base 7.

Figure 7:
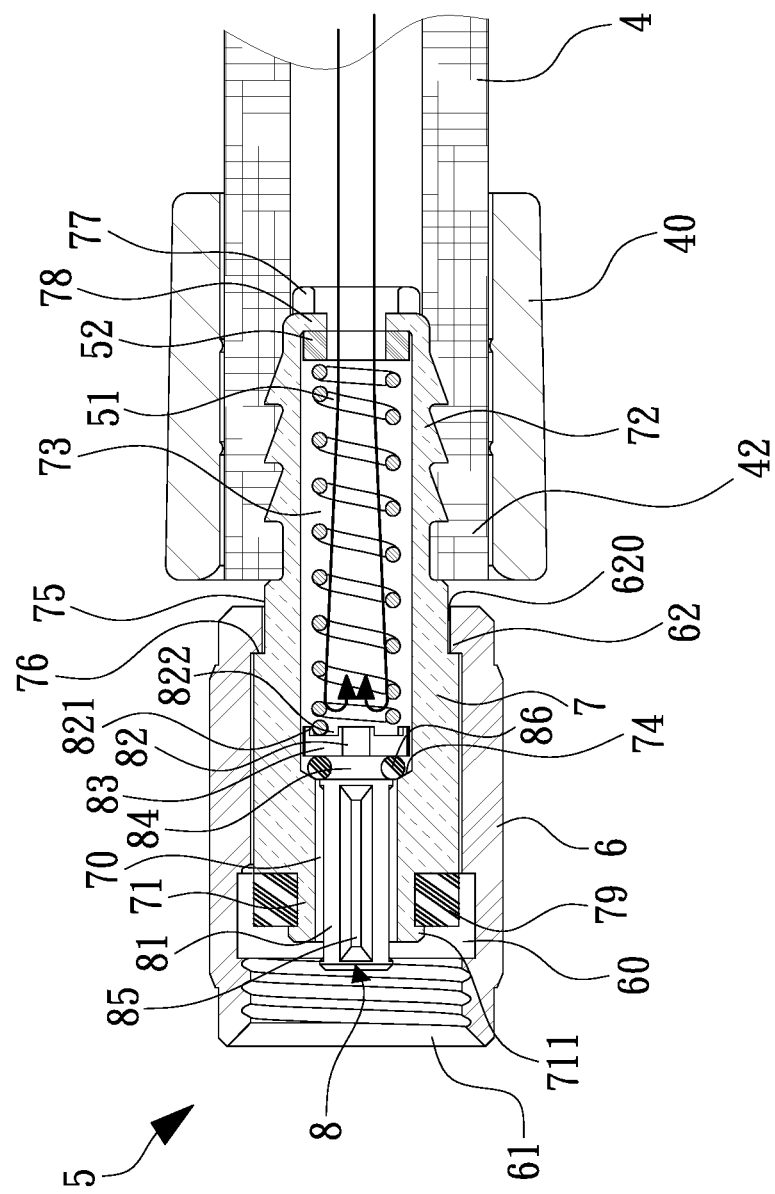
FIG. 7 is a cross sectional view showing the assembly of the check structure and the connection hose according to the preferred embodiment of the present invention.

Referring to FIG. 7, after the button 11 of the box 1 is turned on (as shown in FIG. 1), a pressure of the compressed air of the air compressor forces the chemical sealant to flow, but the chemical sealant does not flow through the hollow room 70 of the cylindrical base 7 because the seal ring 86 of the valve bolt 8 contacts with the tilted fence 74 of the cylindrical base 7 tightly to stop the chemical sealant flowing through the hallow room 70 of the cylindrical base 7, thus avoiding eruption of the chemical sealant.

Figure 9:
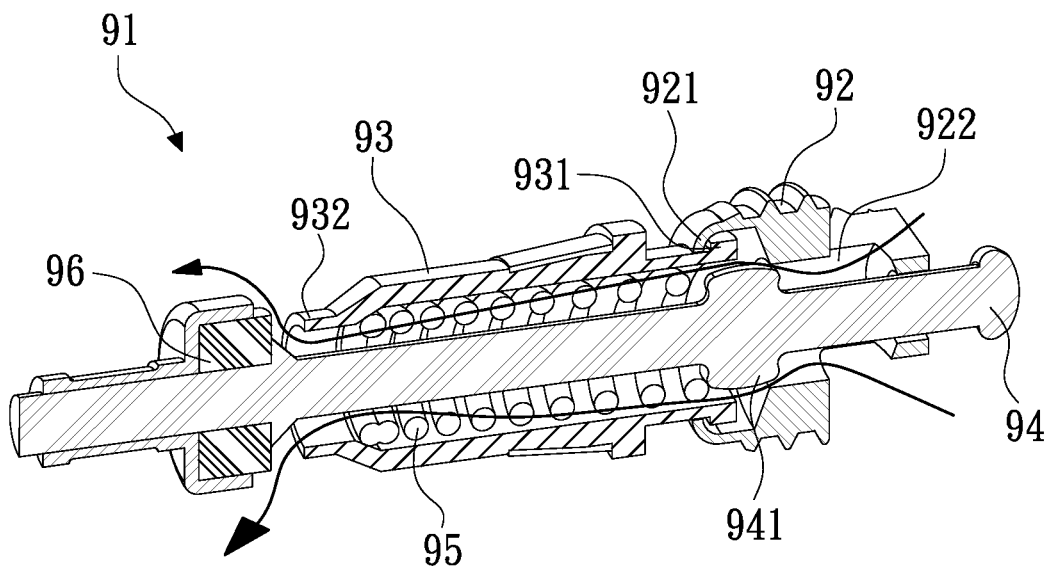
FIG. 9 is a cross-sectional perspective view showing the assembly of a valve core assembly of the air nozzle of the tire according to the preferred embodiment of the present invention.

As shown in FIGS. 8 and 9, a valve core assembly 91 is accommodated in the air nozzle 9 of the tire 99, and the valve core assembly 91 includes a mounting 92, an arcuate stop shoulder 921 surrounding a mouth of the mounting 92 and extending inward from an end of the mounting 92, and an aperture 922 defined in the mounting 92. A hollow receiving sleeve 93 having a retaining shoulder 931 is formed on a first end of the hollow receiving sleeve 93, and a holder 932 is formed on a second end of the hollow receiving sleeve 93. A central needle 94 is formed in a columnar shape and has multiple spaced ribs 941 formed on the central needle 94; a second spring 95 is fit with the central needle 94, and a first end of the second spring 95 abuts against the multiple spaced ribs 941 of the central needle 94. The central needle 94 is received in the hollow receiving sleeve 93 from the first end of the hollow receiving sleeve 93 so that a second end of the second spring 95 contacts with the holder 932, and the second spring 95 is surrounded by the receiving hollow sleeve 93. An abutting loop 96 is fit on a first end of the central needle 94, wherein after the hollow receiving sleeve 93 is connected with the mounting 92, the arcuate stop shoulder 921 of the mounting 92 engages with the retaining shoulder 931 of the hollow receiving sleeve 93, a second end of the central needle 94 extends out of the aperture 922 of the mounting 92, and the second spring 95 pushes the abutting loop 96 of the central needle 94 to close the holder 932 of the hollow receiving sleeve 93.

As illustrated in FIGS. 1 and 8, when the threaded orifice 61 of the check connector 5 is screwed with the air nozzle 9 of the tire 99, the valve bolt 8, of the check connector 5 contacts with and urges the central needle 94 of the air nozzle 9 of the tire 99 to move so that the abutting loop 96 of the central needle 94 removes from the holder 932 of the hollow receiving sleeve 93 (as shown in FIG. 9). When the threaded orifice 61 of the check connector 5 is screwed with the air nozzle 9 of the tire 99, the valve bolt 8 is urged by the central needle 94 of the air nozzle 9 to press the first spring 51 so that the seal ring 86 detaches from the tilted fence 74 of the cylindrical base 7, and the hollow room 70 is communicated. In the meantime, the chemical sealant is pushed by the compressed air to flow into the tire 99 via the conduit 73 of the cylindrical base 7, the multiple peripheral channels 83 of the connecting disc 82 of the valve bolt 8, the hollow room 70, the multiple spaced slots 85 of the valve bolt 8, the passing orifice 790 of the abutting washer 79, the chamber 60 and the threaded orifice 61 of the fitting sleeve 6, the aperture 922 of the mounting 92 of the air nozzle 9 the hollow receiving sleeve 93, and the holder 932 of the hollow receiving sleeve 93 thus feeding the chemical sealant and the compressed air to the tire 99.

Thereby, the check structure for the connection of the air nozzle of the tire and the connection hose of the air compressor is capable of avoiding the eruption of the chemical sealant during incorrect operations.

While the preferred embodiments of the invention have been set forth for the purpose of disclosure, modifications of the disclosed embodiments of the invention and other embodiments thereof may occur to those skilled in the art. Accordingly, the appended claims are intended to cover all embodiments which do not depart from the spirit and scope of the invention.

What is claimed is:

1. A check structure for connection of an air nozzle of a tire with a connection hose of an air compressor,
the check structure comprising:
a fitting sleeve, the fitting sleeve comprising a threaded orifice formed in a first end thereof and having female threads, a through orifice defined on a second end of the fitting sleeve, and a projected shoulder formed on an inner wall of the through orifice, wherein a diameter of the projected shoulder is greater than a diameter of the through orifice, and the threaded orifice is in communications with the through orifice;

a cylindrical base comprising a hollow room defined in the cylindrical base, a stepped coupling segment extending on an outer wall of a first end of the cylindrical base, and a conduit defined in the stepped coupling segment and communicating with the hollow room, wherein a diameter of the conduit is greater than a diameter of the hollow room, and the cylindrical base further includes a tilted fence formed between the hollow room and the conduit;

a valve bolt comprising a post extending on a first end thereof, a connecting disc extending from a second end of the valve bolt, multiple peripheral channels formed around a peripheral wall of the connecting disc, a neck formed between the post and a first end of the connecting disc, and multiple spaced slots defined around the post; and a seal ring fit on the neck of the valve bolt;

wherein:

the first end of the valve bolt is disposed in the hollow room of the cylindrical base via the conduit and the hollow room of the stepped coupling segment of the cylindrical base so that the post of the valve bolt is located in the hollow room and a portion of the post extends from the cylindrical base, and the seal ring of the valve bolt is located in the conduit of the stepped coupling segment and contacts with the tilted fence of the cylindrical base;

a first spring is received into the conduit from the stepped coupling segment of the cylindrical base so that a first end of the first spring abuts against the connecting disc of the valve bolt; and a distal end of the stepped coupling segment of the cylindrical base comprises two opposing bent wings, and the two bent wings are configured to engage with the seal ring, the valve bolt, and the first spring, wherein the first spring pushes the seal ring to contact with the tilted fence of the cylindrical base and to close the hollow room of the cylindrical base.

2. The check structure as claimed in claim 1, wherein:

the fitting sleeve has a chamber defined therein, and the threaded orifice, the chamber, and the through orifice are in communication with one another;

the cylindrical base includes a peg extending from a first end thereof and having a contacting rib extending outward from a distal end of the peg, a hollow room defined in the cylindrical base and the peg, a recessed section formed proximate to the stepped coupling segment;

wherein a diameter of the cylindrical base is greater than a diameter of the recessed section, and a stepped shoulder is defined between the cylindrical base and the recessed section.

3. The check structure as claimed in claim 2, wherein an abutting washer having a passing orifice is disposed on the peg of the cylindrical base, a first end of the abutting washer contacting the cylindrical base, and a second end of the abutting washer abuts against the contacting rib of the cylindrical base.

4. The check structure as claimed in claim 3, wherein:

the connecting disc comprises multiple spaced protrusions extending from a second end thereof, and the connecting disc has an accommodation space surrounded by the multiple spaced protrusions;

the first end of the first spring abuts against the connecting disc of the valve bolt and is located at the accommodation space; and a plain washer is fit on a second end of the first spring;

wherein when the stepped coupling segment connected with the abutting washer, the first spring, the plain washer and the seal ring is fitted to the through orifice of the projected shoulder from the threaded orifice of the fitting sleeve via the chamber, the projected shoulder contacts with the stepped shoulder of the cylindrical base.

5. The check structure as claimed in claim 4, wherein the stepped coupling segment of the cylindrical base extends out of the fitting sleeve to connect with the connection hose.

* * * * *